United States Patent [19]

Alexander

[11] Patent Number: 4,974,276
[45] Date of Patent: Dec. 4, 1990

[54] DOCK LEVELER HOLD-DOWN WITH VARIABLE POSITION SAFETY LEGS

[75] Inventor: James C. Alexander, London, Canada

[73] Assignee: Serco Corporation, Ontario, Canada

[21] Appl. No.: 306,963

[22] Filed: Feb. 6, 1989

Related U.S. Application Data

[63] Continuation-in-part of Ser. No. 232,831, Aug. 16, 1988, Pat. No. 4,847,935.

[51] Int. Cl.⁵ ............................................... E01D 1/00
[52] U.S. Cl. ........................................ 14/71.3; 14/71.7
[58] Field of Search ............................... 14/71.3, 71.7

[56] References Cited

U.S. PATENT DOCUMENTS

| | | | |
|---|---|---|---|
| 3,902,213 | 9/1975 | Pfleger et al. | 14/71.3 |
| 3,921,241 | 11/1975 | Smith | 14/71.3 |
| 4,847,935 | 7/1989 | Alexander et al. | 14/71.3 |

*Primary Examiner*—Ramon S. Britts
*Assistant Examiner*—Gay Ann Spahn
*Attorney, Agent, or Firm*—Sughrue, Mion, Zinn, Macpeak & Seas

[57] ABSTRACT

A hold-down device for a mechanical dock leveler which is spring loaded so that when the hold-down device is released the deck will rise and the lip will extend. When the deck is walked down, the hold-down device maintains the deck in contact with the truck bed. This is accomplished by means of the interaction and geometry between a brake actuating arm and a brake release arm and the associated pins. As the dock leveler is lowered, the perpendicular distance from an anchor pin to the center line of a slot in the brake actuating arm increases. This causes the brake actuating arm to move upward increasing tension on the brake band. The brake release arm moves and increases the braking force. As the dock leveler is raised the braking force is reduced. The leveler includes a two-stage safety leg with a guide bar attached to the safety leg stop. The guide bar limits free travel of the safety leg. The guide bar engages projecting tabs from each stage of the safety leg to require upward or free movement above a respective engagement position before the safety leg can move forward and re-engage the stop.

11 Claims, 5 Drawing Sheets

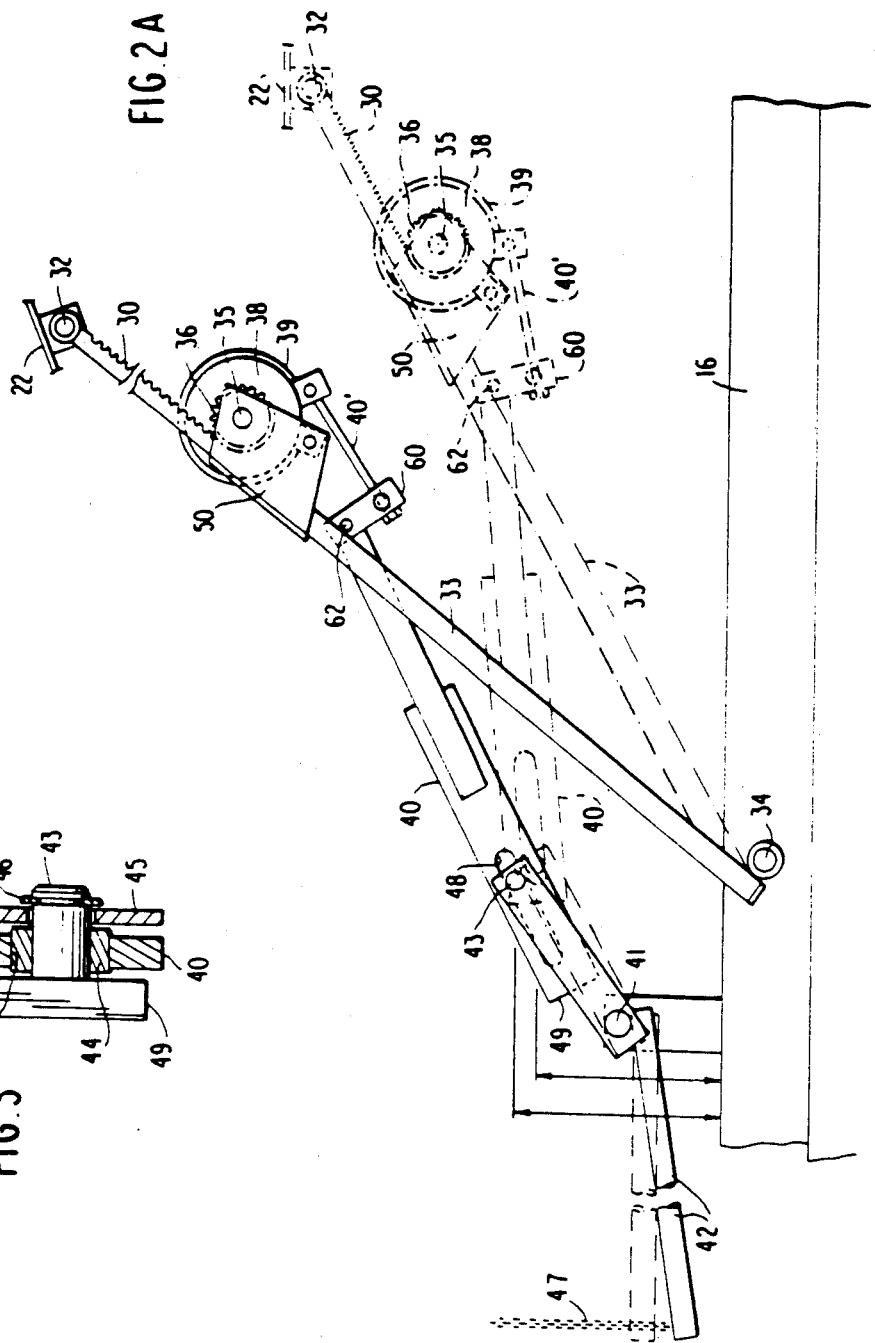

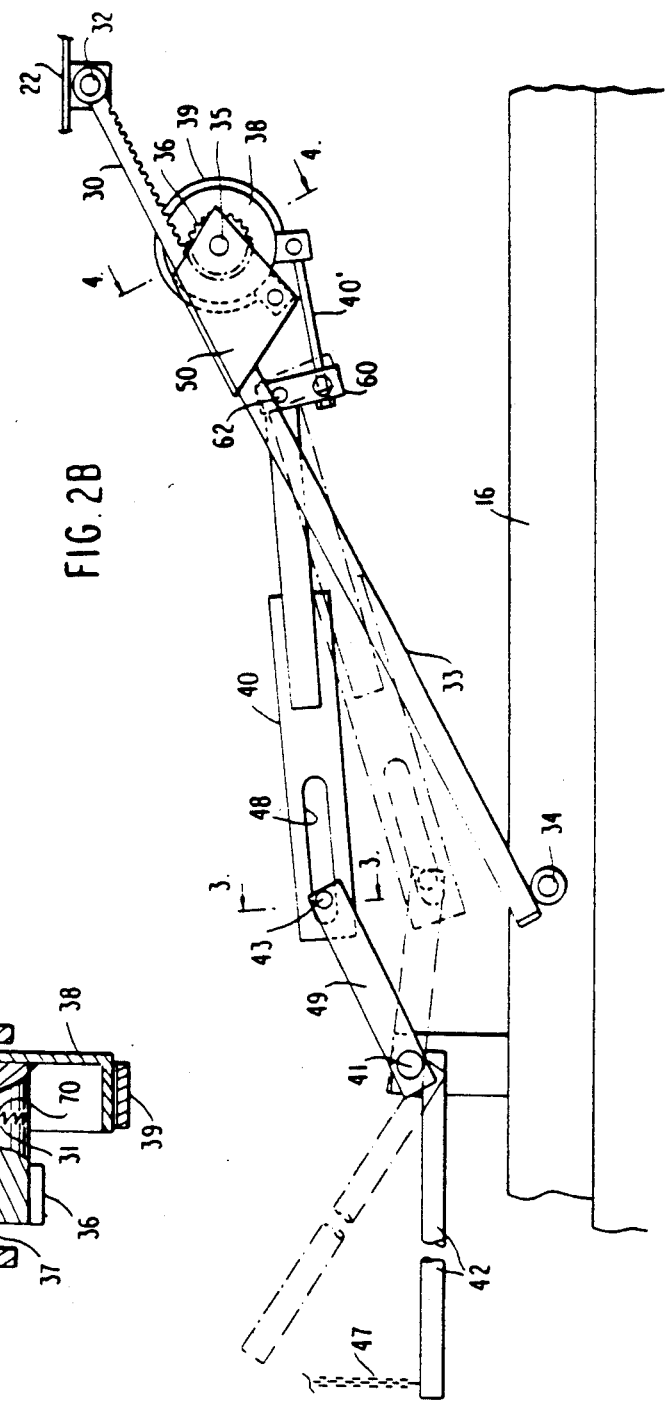
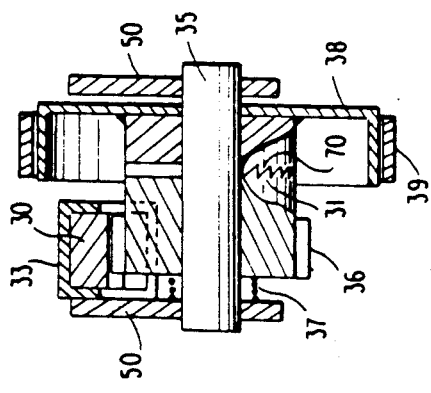
FIG. 2B
FIG. 4

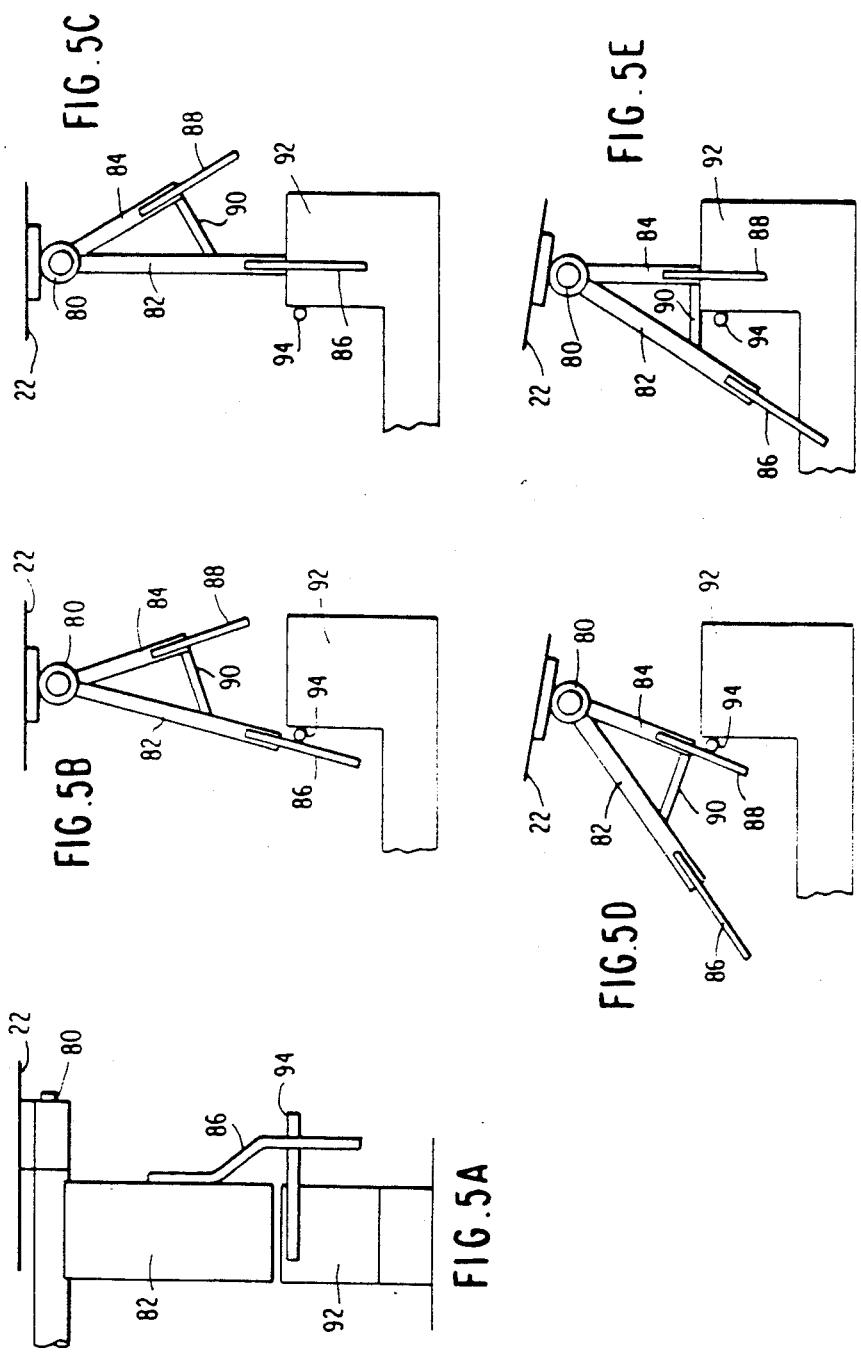

DOCK LEVELER HOLD-DOWN WITH VARIABLE POSITION SAFETY LEGS

This invention is a continuation in part of application Ser. No. 07/232,831 filed on Aug. 16, 1988, now U.S. Pat. No. 4,847,935.

FIELD OF THE INVENTION

This invention relates to a dock leveler and in particular to an improved hold-down device that mechanically maintains the dock in a correct position with respect to a truck bed. This invention also involves the use of safety legs to provide below dock control.

BACKGROUND OF THE INVENTION

Adjustable dock boards or dock levelers are employed on loading docks to span the gap which exists between the dock base and the bed of the truck. The truck is generally backed into position against the dock for loading and unloading. Dock levelers have a ramp or deck which is mounted usually in a pivotal manner at its rear edge and have at the front edge of the deck an extension lip which is hinged so that it rests on the bed of the truck. Generally, the dock leveler structure is positioned within a shallow pit so that the back hinged edge of the deck will be flush with the dock surface and the lip pendant front of the dock and normally maintained in a position flush with the dock when not in use.

When in use the deck is generally angularly inclined with the deck upward or downward relative to the dock to accommodate trucks of different bed heights. The dock then floats by hinged movement between the lip and the deck to accommodate variations in truck height as the truck is loaded or unloaded.

In operation generally, the truck backs in to position against the front of the dock board. A hold-down device is released so that the deck raises upwardly generally by means of a spring mechanism or the like. This upward action of the dock board causes the extension lip to be raised after it has cleared the rear end of the truck bed. With the deck then in its raised position, an operator generally walks out onto the deck to load it by means of his weight and cause it to move downward into engagement with the bed of the truck. The leveler with its extension lip in position thus bridges the gap between the end of the dock and the carrier bed even though the truck's bed may be above or below dock level.

In normal use, a dock leveler is supported at the outer end by resting on top of a truck. Safety legs are well known devices used to limit the downward travel of a dock leveler in case the truck should move away from under the dock leveler lip and allow it to fall. The safety legs are usually designed to provide at least two stop positions between dock level and the minimum downward position. When the safety leg is used to support the dock at the level position, it is often known also as a cross-traffic support.

The art is replete with a number of different configurations. Reference is made to the following U.S. Patents which describe such configurations some having safety legs.

U.S. Pat. Nos. 3,137,017, 3,299,456, 3,368,229, 3,530,488, 3,728,753, 3,835,497, 3,858,264, 3,877,102, 3,902,213, 3,921,241, 3,995,342, 4,104,059, 4,126,909, 4,279,050, 4,328,602, 4,455,702, 4,619,008.

A common deficiency with these prior art devices is their inability to reliably hold down a mechanically operated dock leveler and yet permit acceptable "float". Generally, the dock assembly is spring loaded so that when a hold-down device is released the deck will rise and the lip will extend. Given this bias in the system to mechanically raise the deck, a need exists to provide a technique which will hold down the deck in contact with the truck bed as the truck "floats" as a function of the loading or unloading operation.

Another deficiency of the prior art relates to the technique of compensating for motion of the truck as it rises on its suspension while being unloaded. Modern trucks having an air suspension may rise up to ten inches as a load is removed. Most hold-down devices compensate for this motion by extending against the spring. This in turn creates high loads on the hold-down device as the spring is deflected.

Yet another deficiency in the prior art is the use of cables or plastic straps which are not rugged or reliable. The area of use of a dock leveler, loading dock, is notorious for its dirt, contamination, hazards. Reliability in rugged operation is a requirement of equipment used in that environment. Other hold-down devices employ one-way ratchets and bar designs which also employ a spring to compensate for the rising of a truck bed as it is unloaded. This again causes very high loads on the hold-down device.

In order for the dock leveler to operate below the level position, the safety legs must be pivoted away from the position where they would engage the stops on the lower frame. This is usually accomplished by pulling a chain or other device. However, when the dock leveler is operating below dock, the safety legs often re-engage the stops when not desired. The reason for this is that each time a fork truck travels back and forth into and out of the truck, the suspension of the truck can deflect several inches due to the change in load. Since the dock leveler is supported by the truck, it must follow that motion. If the dock leveler is operating well above the level of the dock, there is little likelihood that the deflection will be so great that the leveler will travel low enough to engage the safety legs against their stops. However, if the dock leveler is operating in a position which is very close to the safety leg stop, the up and down motion of the truck can cause the safety legs to slam down on the stops. Although the safety legs are designed to withstand heavy loads, the repeated pounding is potentially damaging to both the fork truck and the dock leveler, and is objectionable from the view point of noise and operator comfort. A similar problem can occur when the dock leveler is operating at a position which is very close to where the safety legs can re-engage. The dock leveler may rise above that point, allow the legs to re-engage the stops, and the next time the fork truck enters the truck and the suspension deflects, the dock leveler will slam down against the safety legs rather than be supported by the truck.

SUMMARY OF THE INVENTION

Given the deficiencies of the prior art it is an object of this invention to provide for an improved hold-down device for dock levelers.

Another object of this invention is to provide a hold-down device for a mechanical dock leveler which employs a combination of a rack-and-a-gear which allows axial motion to be converted into rotary motion in combination with a frictional brake.

Still a further object of this invention is to provide a hold-down device for a dock leveler which provides sufficient brake tension to resist the force of the deck support springs but, as the deck is urged upward by a rising (unloaded truck) the brake slips, thereby limiting the force on the hold-down device.

Yet another object of this invention is to restrict the travel of the safety legs in such a way that when they have been disengaged, they will not re-engage until the dock leveler has traveled several inches above the position where the safety legs will contact their stops. This will minimize the probability that the safety legs will be repeatedly pounded against their stops. A further object of this invention is to provide a "night lock" which prevents anyone from disengaging the safety legs from their stops so that the dock leveler can be allowed to move downward and provide a space beneath a locked door for the purpose of unauthorized entry to a building.

These and other objects of this invention are accomplished by means of a hold-down device for a mechanical dock leveler which employs a pin which is located so that as the dock leveler is lowered, the perpendicular distance from an anchor pin to the center line of a slot located on a brake actuating arm increases. This increase causes a brake actuating arm to move upward, thereby increasing the tension on a brake band. The invention increases the braking force as the dock leveler is lowered and the braking force is decreased as the dock leveler is raised by a truck which is being unloaded. When the deck assembly is raised above the maximum truck height, the brake actuating arm moves further downward decreasing the brake band tension. The reduced force on the brake actuating arm in turn allows the brake counterweight arm to fall until it is supported by the lower frame or the brake release chain. At this point there is no braking force exerted and the hold-down cannot prevent the deck assembly from rising to the highest point of travel.

This invention shall be described in greater detail by referring to the attached drawing and description of the preferred embodiment that follows.

BRIEF DESCRIPTION OF THE DRAWING

FIG. 2A is a schematic side view illustrating the hold-down device of FIG. 1 in raised and lowered positions respectively with the brake engaged and disengaged;

FIG. 2B is a schematic side view illustrating the hold-down device of FIG. 1 in the lowered position, respectively, with the brake engaged and disengaged;

FIG. 3 is a sectional view along line 3—3 in FIG. 2A illustrating the brake section;

FIG. 4 is a sectional along line 4—4 in FIG. 2B illustrating the gear with clutch teeth assembly;

FIG. 5A is a front schematic view of a first embodiment of a safety leg assembly;

FIG. 5B is a side view of a first embodiment of a safety leg assembly with the leveler above the safety leg engagement point;

FIG. 5C is a side view of a first embodiment of a safety leg assembly with the safety leg engaged as illustrated in FIG. 1;

FIG. 5D is a side view of a first embodiment of a safety leg assembly with the leveler in a below dock position;

FIG. 5E is a side view of a first embodiment of a safety leg assembly with the safety leg engaged in a below dock position;

DESCRIPTION OF PREFERRED EMBODIMENT

Referring now to FIGS. 1 through 4 the preferred embodiment of this invention will be described.

Figure 1:
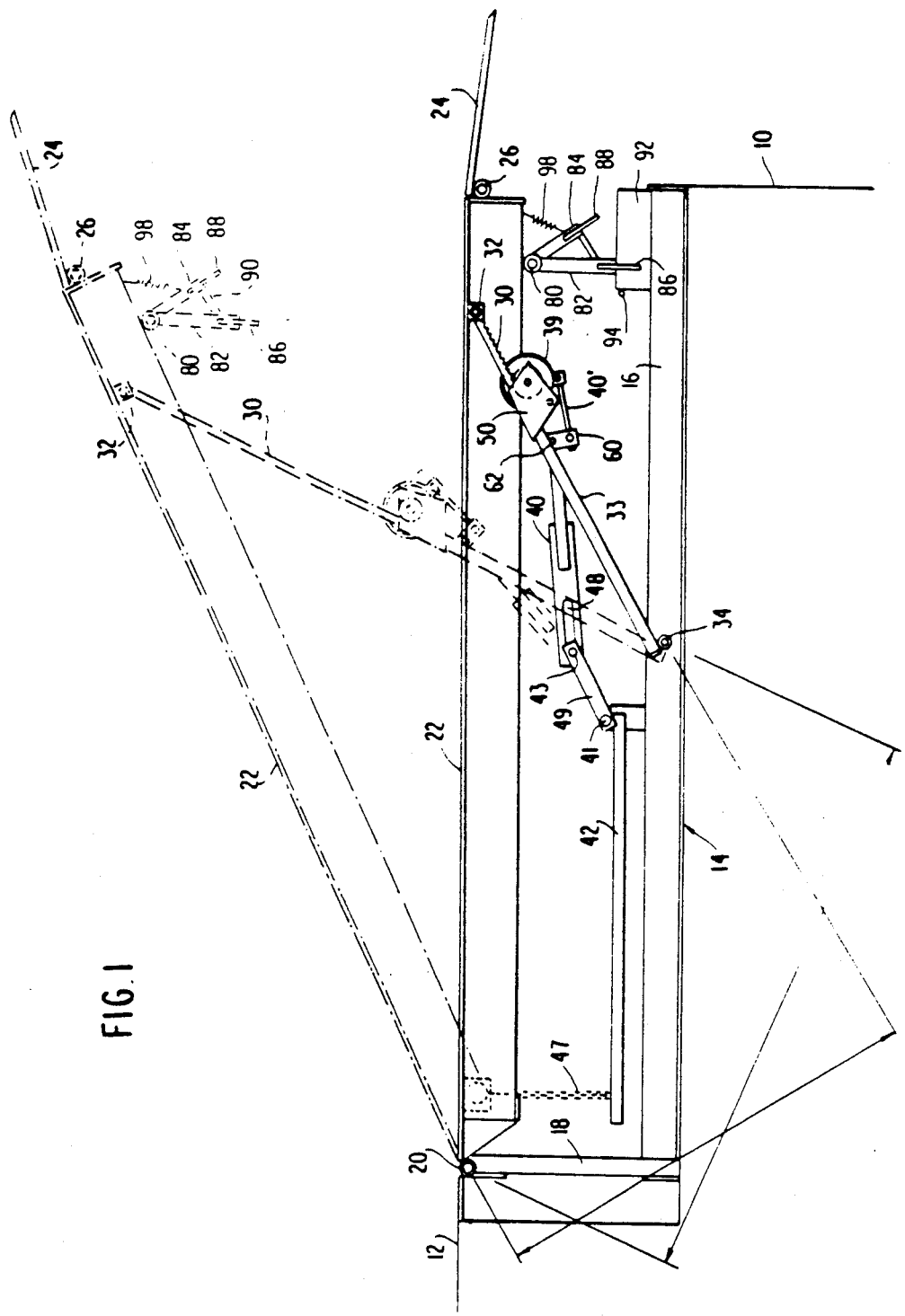
FIG. 1 is a schematic side view of a mechanical dock leveler and the components of this invention.

In FIG. 1, a dock loading zone generally comprises a dock face 10 a dock surface 12. A shallow pit area 14 is recessed into the dock surface. It is in this area that dock leveler is generally built in. The dock leveler generally comprises a support frame 16 which is fixedly mounted into the pit 14. The leveler has a vertical section 18 welded to the base 16 with a pivot 20. The leveler itself comprises a deck 22 having a lip 24 pivoted about pin 26. The leveler is upwardly biased by a spring mechanism. It will be understood that the elements of the dock leveler themselves are generally supplied as a complete system built into the pit as an integral unit.

Prior to describing the operation of this invention, the salient elements will be identified. A rack bar 30 having geared teeth is attached to the upper end of the deck portion 22 of the dock leveler. A pin 32 attaches the rack bar 30 to the deck assembly.

Housing 33 is attached at its lower end to the support frame 16. The rack bar 30 telescopes from the housing 33. A pin 34 attaches the housing 33 to the support frame 16 of the dock leveler. Brackets 50 are positioned to support the gear shaft 35.

A gear shaft 35 passes through the upper end of the housing having a gear and brake drum. The gear 36 has a series of clutch teeth 31 which engage similar teeth on the end of a brake drum hub 70. The gear rotates on the shaft 35 through the housing and engages the rack bar 30. The clutch teeth 31 are illustrated in FIG. 4.

A spring 37 biases the clutch teeth on the gear 36 to engage the clutch teeth 31 on the brake drum hub 70. A brake drum assembly 38 has clutch teeth on the end of the hub. A brake band 39 is disposed about the outside periphery of the brake drum 38. A brake actuating arm 40 has a slotted hole 48. The brake actuating arm 40 has an extension arm 60. Adjustable link 40, is attached at one end to brake band 39 and the other end to extension arm 60 which is an extension of brake actuating arm 40. Brake actuating arm 40 pivots on pin 62 which is welded to housing 33. A brake counterweight arm 42 is carried on a pivot pin 41. An intermediate arm member 49 of the brake arm pivots about pin 41 and has a pin 43 placed into slotted hole 48. The force of the counterweight causes the brake actuating arm 40 to tighten the brake band 39 against the outside of the brake drum.

FIG. 3 illustrates a roller 44 disposed about pin 43. A washer 45 is held in place by a retaining ring 46. A brake release handle with chain 47 (see FIG. 1) is used to raise the brake counterweight arm 42 to disengage the brake.

FIG. 1 illustrates the system in two positions. With the dock leveler lowered in the generally horizontal position the moment of the hold-down device is defined as the distance between the pin 20 and the line of pin 32 and pin 34. With the deck in the raised position as illustrated in FIG. 1, the moment arm passing through the two points is also illustrated in FIG. 1. This illustration shows that the moment arm is shorter in the lowered position, requiring a greater force to exert a given torque.

FIGS. 2A and 2B illustrate in greater detail the hold-down device in the raised and lowered positions. FIG. 2A illustrates the device raised and lowered positions, respectively. The brake is also illustrated engaged and disengaged for lowered position in FIG. 2B.

The device operates as follows. The clutch teeth 31 on the hubs on the gear 36 and the brake drum 38 are straight on one side and angled on the other. Thus, as the rack bar 30 is pushed into the housing 33 the gear 36 rotates counterclockwise. The angled face of the clutch teeth 31 force the gear 36 away from the brake drum hub allowing the gear 36 and the rack 30 to move freely and the deck 16 to be lowered. When the rack 30 is pulled from the housing 33, the angled face of the clutch teeth 31 cause the gear 36 to engage drum 38. The gear 36 and the rack 30 are restrained from moving, thus preventing the deck portion 22 of the dock leveler from rising. The brake band 39 is held in contact with the brake drum 38 by the weight of the brake counterweight arm 42 (see FIG. 3) pivoting about the fixed pin 41 acting through the pin 43 and the roller 44. This causes the brake actuating arm 40 having the slotted hole 48 to be raised. The brake is released by pulling the release ring and chain 47 which lifts the counterweight arm 42, lowers the brake actuating arm and loosens the brake band 39.

As indicated, a functional requirement for a hold-down device used in dock levelers is to compensate for the motion of the truck as it floats on its suspension while being unloaded. Contemporary trucks using air suspension systems may have a vertical float of up to ten inches as they are being unloaded. Prior art hold-down devices compensate for this motion by extending the device against a spring. This in turn creates very high loads on the hold-down device as a function of spring deflection. This invention overcomes that deficiency in the prior art because the brake torque is sufficient to resist the force of the deck support springs (not shown) but as the deck is forced upward by a rising truck bed, the brake slips thus limiting the force on the hold-down device.

Further, in accordance with this invention the geometry of the interaction of the brake actuating arm 40 and the brake counterweight arm 42 are arranged in a unique geometry. Given the constraints of the dock leveler pit depth, typically a function of the vertical height of the pit, and the required travel of the hold-down device, the effective moment arm of the hold-down device with respect to deck assembly decreases significantly from the highest to lowest position. Thus, to maintain the same rotational restraining force on the dock leveler the force in the hold-down device must increase as the moment arm decreases. Moreover, the only time that the dock leveler must travel higher than the highest truck is when the lip is being extended. That is, the lip must extend above the truck bed height so that when the leveler is lowered, the lip will rest on the truck bed. Thus, it is desirable that the restraining force of the hold-down be reduced so that if the operator unintentionally relaxes his grip on the brake release ring and chain 47, the hold-down restraining force will not prevent the dock leveler from travelling high enough to extend the lip.

This invention achieves that feature by selecting the location of the slotted hole 48 so that as the dock leveler deck 22 is lowered, the distance from the pin 43 to the frame 16 decreases as illustrated in FIG. 2A. This causes the brake counterweight arm 40 to move upward increasing the force on the pin 43 and thus increasing tension on the brake band 39. Friction at the pivot pin 41 tends to resist rotation and the desired increase in braking force is achieved. Consequently, not only is the braking force increased as the dock leveler is lowered but, the braking force is decreased as the dock leveler is raised by a truck which is being unloaded. As the deck assembly is raised above the maximum truck height, the brake actuating arm moves further downward, decreasing the braking force and tension. The reduced force on the brake actuating arm in turn allows the brake counterweight arm to fall until it is supported by the lower frame or chain 47. At this point, no braking force is exerted and the hold-down cannot prevent the deck assembly from raising to its highest point of travel.

Referring now to FIGS. 1 and 5, the operation of this device with the safety legs will now be described. As illustrated in FIG. 1, the deck 22 has pivotally mounted to it via a pin 80 a safety leg assembly that has positive limits on free travel. FIG. 1 in the solid line illustrates the deck in the horizontal or cross-traffic position. The safety leg assembly comprises a pair of leg elements 82 and 84. To leg assembly 82 an elongated guide bar 86 is attached. The shorter leg 84 has a similar extension or guide bar 88. The two legs may be coupled to each other by a web 90. The frame 16 has a safety leg stop 92 with its own horizontally extending guide bar 94. While not illustrated in the Figures, it will be appreciated that the leg assembly is generally biased into the position illustrated in the solid lines of FIG. 1 by means of a spring assembly 98. The leg assembly is also operated via a manual chain which extends through the deck 22 to allow the operator to rotate the leg assembly out of position. Also, while not illustrated, typically a pair of legs are positioned at points equal distance from the center line of the ramp. Only one such assembly need have the guide bars 86 and 88 since the disengagement of the assembly requires only one such set of bars.

Referring now to FIG. 5, the operation of the first preferred embodiment will be described. FIG. 5A illustrates the safety leg 82 engaging the safety leg stop 92. As illustrated in FIG. 5A, the rear view of the safety leg assembly, the guide bar 86 attached to the safety leg assembly 82 engages the horizontal bar 94 on the safety leg stop 92. In this configuration, the dock leveler must be raised several inches above the engagement point before the safety legs can move forward and re-engage the stop 92. FIG. 5B illustrates the point of where the bar 86 disposed behind the horizontal bar 94 and would re-engage but for the bar 94. By this technique, the dock leveler will travel freely several inches above the safety leg engagement point before allowing the legs to re-engage. This technique prevents repeated pounding on the safety legs, a common failure mode.

Referring now to FIG. 5C, the primary safety leg 82 is in the engaged position on the stop 92. In this mode, a night lock feature is provided eliminating the requirement for an external nightkeeper latch. When the door above the dock leveler is closed (not illustrated) the dock leveler cannot be raised far enough to allow the safety legs to be disengaged, and thereby permit the dock leveler to be lowered to provide an opening between the ramp 22 and door. This is because the leveler must raise upward a sufficient distance to allow the guide bar 86 to clear the guide bar 94. The presence of the door in a closed position restrains the ramp from such a movement.

FIGS. 5D and 5E illustrate the safety leg engaged in the below dock configuration with secondary leg 84 engaging the stop 92. The bar 88 associated with the secondary leg 84 is located at a position with respect to the horizontal bar 94 such that the leveler must travel upward several inches to allow those bars to clear each other.

Figure 6A:
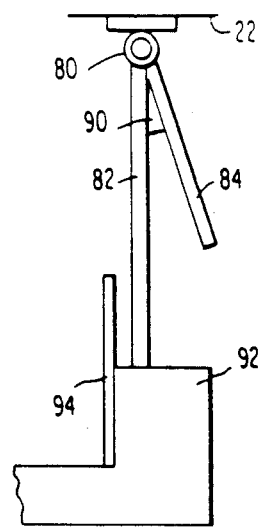
FIG. 6A is a side view of a second embodiment of this invention with the safety leg assembly engaged.
Figure 6B:
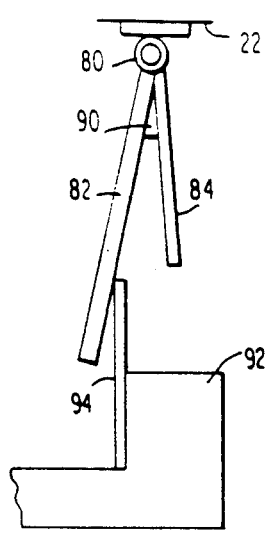
FIG. 6B is a side view of a second embodiment of this invention with the safety leg assembly above the engagement level.
Figure 6C:
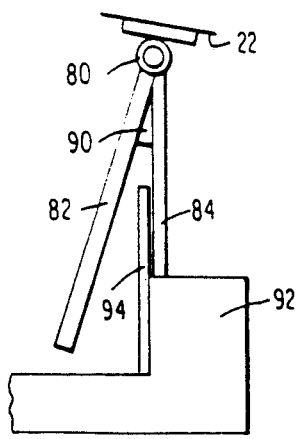
FIG. 6C is a side view of a second embodiment of this invention with the safety leg assembly engaged in a below dock level position.
Figure 6D:
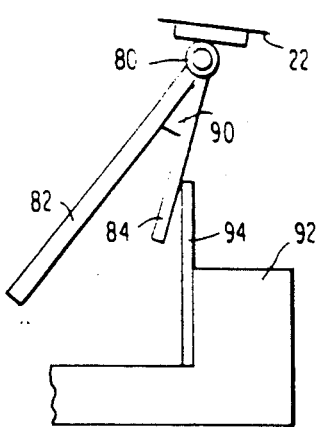
FIG. 6D is a side view of a second embodiment of this invention with the safety leg assembly in a position below dock level.

FIGS. 6A and 6B illustrate a second preferred embodiment of the safety leg aspect of this invention. In this configuration, the guide bars are attached to the back of the safety leg stop and directly restrain the safety legs. While this embodiment reduces the number of components, it does require a greater vertical space for the operation of the device and is identical to that as illustrated in FIG. 5.

It will be appreciated if modifications of this invention may be practiced without departing from the essential scope thereof.

Having described my invention I claim:

1. A dock leveler comprising:
   a support structure, a safety leg stop on said support structure, a guide bar extending from said safety leg stop:
   a ramp hinged to said support structure and movable from a horizontal position to positions upwardly and downwardly inclined; a lip hingedly by connected to said ramp, said lip movable from a downward pendent position to a position substantially aligned with said ramp;
   means to bias said ramp upward;
   means to hold said lip in contact with a truck surface capable of vertical movement as said truck is loaded or unloaded, said means to hold comprising,
   telescoping arm means pivotally connected between said support structure and said ramp, said telescoping arm means having one member with a series of teeth defining a rack brake and gear means mounted on said telescoping arm means, and in contact with said rack brake,
   articulating arm means coupled to said support structure and to said rack brake and clutch means for actuating or releasing said rack brake or varying the braking force of said rack brake and gear means, whereby as said ramp is initially raised and lowered into position with said truck, said rack brake, extends and said rack brake telescopes outward and rotates said gear by engagement with said teeth and when said ramp is urged by vertical movement of said truck surface the braking force of said rack brake varies to hold said ramp in position with said truck surface, and
   safety leg means pivotally connected to said ramp, said safety leg means having a tab engagable with said guide bar whereby, as said ramp is lowered, said safety leg means engages said safety leg stop, and said ramp being raised to a height sufficient to allow said tab to clear said guide bar to permit said safety leg to re-engage said stop at a lower point.

2. The dock leveler of claim 1 wherein said articulating arm means comprises a first arm pivotally connected to said support structure and a second arm having a slotted hole, a pin mounted in said slotted hole pivotally connecting said first arm to said second arm, and a brake actuating arm protruding from said second arm and coupled to said brake and gear means.

3. The dock leveler of claim 2 further comprising a brake release arm having a manual release chain at one end and connected to said first arm at the opposite end.

4. The dock leveler of claims 1 wherein said brake and gear means comprises a brake drum hub, a brake band positioned on the circumference of said drum hub, clutch teeth on one end of said hub, a pin through said hub, a gear rotatably mounted on said pin coaxial with said hub, said gear having a series of clutch teeth on one end engagable with said teeth on said hub, said gear engaging said rack and rotating in one direction as said rack is retracted when the leveler is lowered but said teeth not engaging the clutch teeth on said hub.

5. The dock leveler of claim 4 further comprising means to bias said gear into contact with said brake drum hub, said teeth configured to engage said clutch teeth as said rack is extended.

6. The dock leveler of claim 4 further comprising a housing for said rack brake and gear means, said brake band fixed at one end to said housing, said brake band held in position by the weight of said articulating arm means to engage said rack brake and said brake band loosened to disengage said brake when said articulating arm means is moved to a brake release position.

7. The dock leveler of claim 1 wherein said safety leg means comprises a two-stage leg, a depending tab associated with each stage and means to bias said safety leg means in a position engaging a first stage, wherein said depending tabs engage said guide bar.

8. The dock leveler of claim 7 wherein said two-stage leg comprises a first section engagable with said safety leg stop and a second section engagable with said safety leg stop, said second section being shorter than said first section.

9. The dock leveler of claim 8 further comprising a web coupling said first section to said second section.

10. The dock leveler of claim 7 wherein said guide bar is disposed horizontally projecting from a side of said safety leg stop.

11. The dock leveler of claim 1 wherein said guide bar is disposed to project from the top of said safety leg stop.

* * * * *